Figure 1:
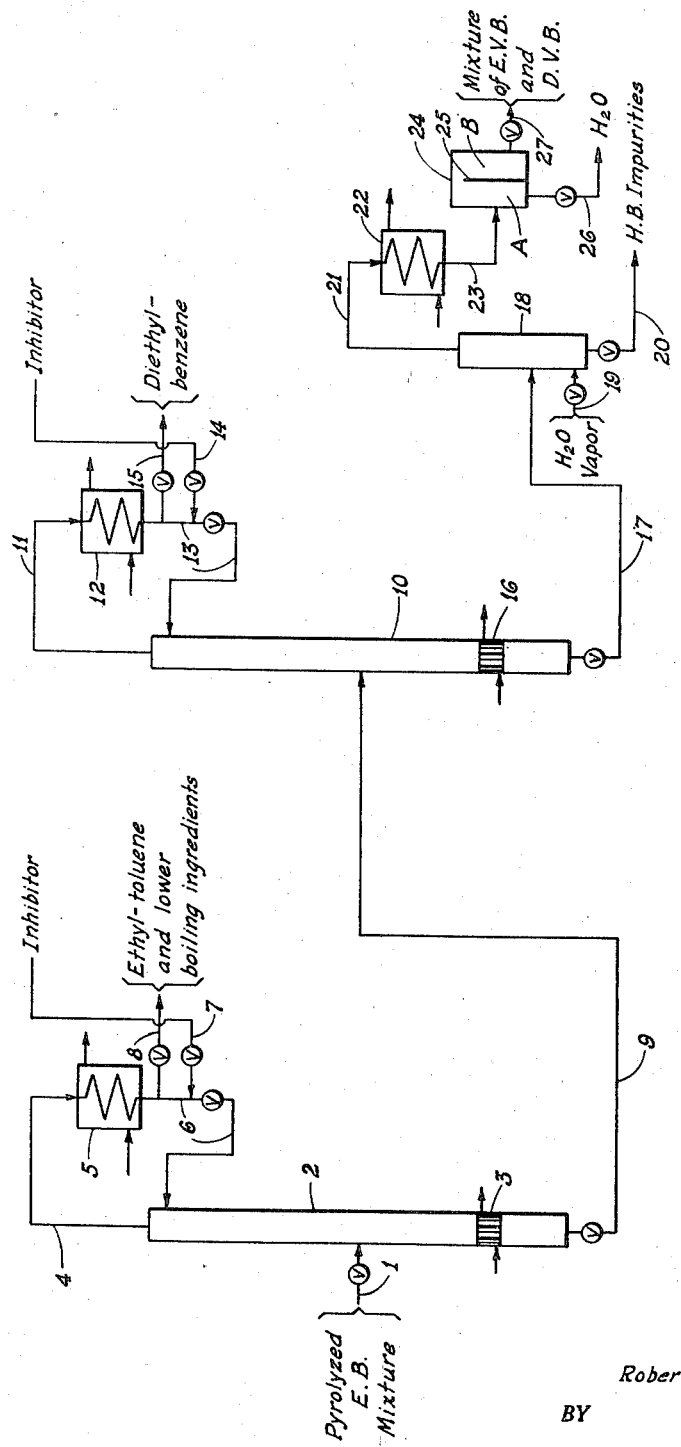

July 27, 1948.                 R. R. DREISBACH                    2,445,941
            PURIFICATION OF READILY POLYMERIZABLE VINYL
                  AROMATIC COMPOUNDS BY DISTILLATION
Filed Dec. 27, 1943                                      2 Sheets-Sheet 1

INVENTOR.
Robert R. Dreisbach
BY
Griswold & Burdick
ATTORNEYS

Patented July 27, 1948

2,445,941

UNITED STATES PATENT OFFICE 2,445,941

PURIFICATION OF READILY POLYMERIZABLE VINYL AROMATIC COMPOUNDS BY DISTILLATION

Robert R. Dreisbach, Midland, Mich., assignor to The Dow Chemical Company, Midland, Mich., a corporation of Delaware Application December 27, 1943, Serial No. 515,692

6 Claims. (Cl. 202—46)

This invention concerns a method of concentrating and removing colored impurities from vinyl aromatic compounds which are highly susceptible to polymerization. It pertains especially to the problem of decolorizing and concentrating the divinylbenzene present in mixtures formed by the pyrolysis of diethylbenzene or higher dialkyl-benzenes.

It is well known that vinyl aromatic compounds may be formed by the pyrolysis of alkylated aromatic compounds such as ethylbenzene, isopropylbenzene, diethylbenzene, or tri-isopropylbenzene, etc., but that, due to the ease with which the vinyl aromatic products are polymerized when heated and the fact that the pyrolysis mixtures usually contain, together with the vinyl aromatic products, other compounds of close to the same boiling points, purification of the vinyl aromatic products by fractional distillation is difficult. For instance, the mixture, consisting largely of styrene and ethylbenzene, which is obtained by the pyrolysis of ethylbenzene has been known for many years and is among the simplest of such pyrolysis mixtures. However, until recently (cf. Stanley, Chem. and Ind. 57, 93 (1938)), it was thought that pure styrene cannot be recovered from such pyrolysis mixture by fractional distillation. Dreisbach et al., in United States Patent 2,240,764, have shown that by continuously feeding a polymerization inhibitor into an upper section of the distilling column, such pyrolysis mixture may be fractionally distilled to recover pure styrene in good yield. The patent teaches that by applying the same procedure in distilling other vinyl aromatic compounds, e. g. para-chlorostyrene or divinylbenzene, etc., the polymerization which normally occurs during distillation "may be reduced greatly and sometimes be entirely prevented."

The method of said patent is entirely satisfactory for the recovery of pure styrene from mixtures of the same and ethylbenzene and it may be used in the laboratory or on a small manufacturing scale for the recovery of more readily polymerizable vinyl aromatic compounds from pyrolysis mixtures. However, it has not, of itself, proven convenient or entirely satisfactory for the recovery on a large scale of certain other vinyl aromatic compounds from pyrolysis mixtures containing the same. Many vinyl aromatic compounds such as para-chloro-styrene, para-bromostyrene, vinyl-dichloro-benzene, divinylbenzene and ethyl-divinylbenzene, etc., polymerize far more readily and rapidly than styrene at a given temperature. The induction period, i. e. the period over which such compound may be maintained at a given temperature before being polymerized to an appreciable extent, is shorter than for styrene. Furthermore, such compounds have boiling points higher than that of styrene and the rate of polymerization increases, of course, with a rise in temperature. For these reasons, it is far more difficult to distill such compounds, without polymerizing a considerable portion thereof, than it is to distill styrene. The polymers and copolymers of polyvinyl aromatic compounds, in particular, are in most instances solid bodies which are substantially insoluble in benzene and other solvents for polystyrene and which are not readily removed, if permitted to form in a considerable amount within a still or a distilling column. The repair of a distilling column which has become plugged with such insoluble polymer or copolymer is difficult and expensive.

In general, the time over which a freshly prepared solution of a vinyl aromatic compound may be maintained at a given temperature without the occurrence of appreciable polymerization becomes less with increase in the concentration of the vinyl aromatic compound, and vice versa. Also, the induction period preceding polymerization of the aforementioned readily polymerizable compounds may be increased, in some instances to as long as 8 hours at 70°–100° C., by treatment of such compound, or a solution thereof, with a polymerization inhibitor. After expiration of the induction period, polymerization occurs. In other words, the usual effect of an inhibitor is to extend the induction period, but not to prevent the polymerization from ultimately occurring.

A vinyl aromatic compound, formed by the pyrolysis of a corresponding alkylated aromatic compound, is usually one of the higher-boiling ingredients of the pyrolysis mixture in which it occurs. A pyrolysis mixture, containing in dilute form one of the aforementioned vinyl aromatic compounds, of higher boiling point and more readily polymerizable than styrene, may be fractionally distilled under vacuum and in the presence of a polymerization inhibitor, as described in United States Patent 2,240,764, to distill off the lower-boiling ingredients and recover the residual vinyl aromatic compound in concentrated form, provided the distillation is discontinued or the vinyl aromatic compound is removed from the still before expiration of the induction period. By employing an effective inhibitor in the operation, such distillation to concentrate in the residue a readily polymerizable vinyl aromatic compound may be carried out on a commercial scale without the occurrence of appreciable polymerization. In fact, the pyrolysis mixture may be subjected in continuous manner to two or more such distillations in succession so as to recover different lower-boiling ingredients of the pyrolysis mixture in separate fractions.

However, during such distillation of a pyrolysis mixture to obtain a residual concentrate of one of the readily polymerizable vinyl aromatic compounds with which this invention is concerned, the induction period, preceding polymerization of the vinyl aromatic compound, is largely used up and the remaining unspent portion of the induction period is further shortened due to the increase in concentration of said compound. Any attempt to continue the distillation so as to recover such compound as a fraction of the distillate is likely to result in polymerization with plugging of the still or the distilling column. In order to avoid polymerization, the vinyl aromatic compound must be distilled in the presence of an inhibitor at a pressure lower than is conveniently obtainable in commercial practice. The probability of polymerization occurring becomes greater, of course, with increase in the quantity of the compound to be distilled and with lengthening of the time over which the distillation is carried out. For these reasons, the process of the aforementioned United States Patent 2,240,764 is not, of itself, entirely satisfactory for the purification on a commercial scale of large quantities of vinyl aromatic compounds which are higher boiling and more readily polymerizable than styrene.

I have discovered that such readily polymerizable vinyl aromatic compounds, regardless of the concentration, may be distilled without appreciable occurrence of polymerization, by carrying the distillation out at sub-atmospheric pressure together with an equal weight or more of water vapor and in the presence of a polymerization inhibitor other than the water vapor. I have further found that the vinyl aromatic compound collected in the distillate has an induction period approximately the same as that of the freshly prepared compound, i. e. distillation of such compound has the effect of erasing its past history, as far as the tendency toward polymerization is concerned, and of starting anew the normal induction period for the compound. After being distilled, the compound may be treated with a minor amount of a polymerization inhibitor and be stored at room temperature, e. g. for a month or longer, without being polymerized to an appreciable extent. When desired, the compound thus treated may again be distilled under vacuum, preferably with water vapor, to remove the inhibitor and obtain the compound in readily polymerizable form.

During such distillation under vacuum together with water vapor, the latter has an effect of lowering the distilling temperature below that required at the same pressure in the absence of the water vapor. Because of such lowering of the distilling temperatures the tendency toward polymerization is reduced. The water vapor has a further effect of preventing or retarding polymerization under conditions of time and temperature which, in its absence, result in polymerization of the vinyl aromatic compound to a considerable extent. Whether the action of the water vapor in preventing polymerization at a given temperature is due to dilution of the vinyl aromatic compound or to the water vapor serving as a polymerization inhibitor, i. e. a negative catalyst for the polymerization, has not definitely been established. Since the polymerization of vinyl aromatic compounds usually occurs in the liquid phase and since water is soluble only to a limited extent in the liquid hydrocarbons of the afore-mentioned pyrolysis mixtures, it is probable that the water vapor acts as a polymerization inhibitor. However, neither water vapor alone nor a usual polymerization inhibitor alone is sufficiently effective to preclude the occurrence of polymerization during the distillation under vacuum of the vinyl aromatic compounds with which the invention is concerned. By the conjoint use both of water vapor and of such other polymerization inhibitor, the distillation may be carried out without appreciable polymerization of the vinyl aromatic compound.

The step of subjecting a readily polymerizable vinyl aromatic compound to such distillation under vacuum with water vapor may be applied in any of several ways. It may be applied in distilling the vinyl aromatic hydrocarbon, or a pyrolysis mixture containing such compound, to free the same of the higher-boiling colored impurities incident to its manufacture. It may also be applied to distill, and thus renew the induction period of, the vinyl aromatic compound when the latter has previously been heated, e. g. during a fractional distillation in the absence of water vapor, for a time approaching expiration of its induction period. For either such purpose, the distillation with water vapor may be carried out rapidly and without fractionation. Again, a pyrolysis mixture, or a fraction of such mixture, containing the readily polymerizable compound in dilute form may be fractionally distilled with water vapor under vacuum and in the presence of an inhibitor other than the water vapor to obtain the vinyl aromatic compound in concentrated form, either in the residue from the distillation or preferably in a fraction of the distillate. During such fractional distillation with water vapor to concentrate and distill the vinyl aromatic compound, the other objectives just mentioned, i. e. the removal of colored impurities and renewal of the induction period of the compound, may also be obtained.

However, the degree of fractionation obtainable when using water vapor, as just described, is not as great as is obtainable at the same distilling pressure and with the same distilling column in the absence of the water vapor. Accordingly, one of the afore-mentioned readily polymerizable compounds is advantageously recovered in concentrated or purified form from a pyrolysis mixture containing the same by subjecting the mixture to one or more fractional distillations under vacuum in the presence of a polymerization inhibitor, but in the absence of water vapor, to remove the lower boiling ingredients and concentrate the vinyl aromatic compound in the residue. Thereafter the distillation under vacuum is continued, in the same or a different still, with introduction of steam or water vapor so as to distill the concentrated vinyl aromatic compound. The induction period of the vinyl aromatic compound is thereby renewed and the compound is separated from higher-boiling colored impurities.

In carrying out such series of distillation operations, care should be taken to terminate the fractional distillations without water vapor before expiration of the induction period of the vinyl aromatic compound. By carrying the fractional distillations out in the presence of a highly effective polymerization inhibitor, preferably a nitrophenol, it is usually possible on a commercial scale to remove lower-boiling impurities almost completely from the desired vinyl aromatic compound, or compounds, before expiration of the induction period. However, it may in some instances be advisable to discontinue the fractional distillation before the lower-boiling impurities are entirely removed from the residual vinyl aromatic compound. In such case the latter is distilled with water vapor to renew its induction period, after which it is returned to the step of fractional distillation without water vapor where removal of the lower-boiling ingredients is completed. Such a series of distillation operations may be carried out batchwise, if desired, but they are preferably carried out in continuous manner.

The invention pertains especially to the recovery of divinylbenzene, or mixtures of divinylbenzene and ethylvinylbenzene, from reaction mixtures obtainable by the pyrolysis of diethylbenzene. Such crude reaction mixture usually comprises unreacted diethylbenzene, divinylbenzene, ethyl-vinylbenzene, and a number of lower-boiling ingredients such as ethylbenzene, styrene, ethyl-toluene, etc. Of the ingredients just mentioned, divinylbenzene has the highest boiling point, ethyl-vinylbenzene the next highest, and diethylbenzene is next in the order of boiling points. The mixture may, and often does, contain two or more isomers of each of these three ingredients and the boiling points of the different compounds are sufficiently close together so that careful fractionation is required to separate one compound from another. Each compound is usually obtained as a mixture of its isomers, i. e. in most instances one kind of compound is separated from another, but no attempt is made to separate the isomers of a given compound. In addition to the foregoing ingredients, the pyrolysis mixture usually contains a minor amount of higher-boiling colored impurities.

The principal use for divinyl benzene is in the preparation of solid polymers and copolymers thereof which are resistant to the dissolving or swelling action of organic liquids, e. g. benzene, toluene, chlorobenzene, ethylene chloride, acetone, etc. For such purpose, a mixture of ethyl-vinylbenzene and divinylbenzene, containing from 5 to 90 per cent by weight of the latter, often is as satisfactory as pure divinylbenzene. Distillation operations such as those described above may be applied to recover, from a pyrolyzed diethylbenzene mixture, either purified divinylbenzene or such mixture of ethyl-vinylbenzene and divinylbenzene, but the procedure in carrying out the distillations may advantageously be varied somewhat, depending upon which of these results is desired. However, in either instance, the process involves the step of distilling the product under vacuum together with water vapor and in the presence of an inhibitor other than the water vapor.

Figure 2:
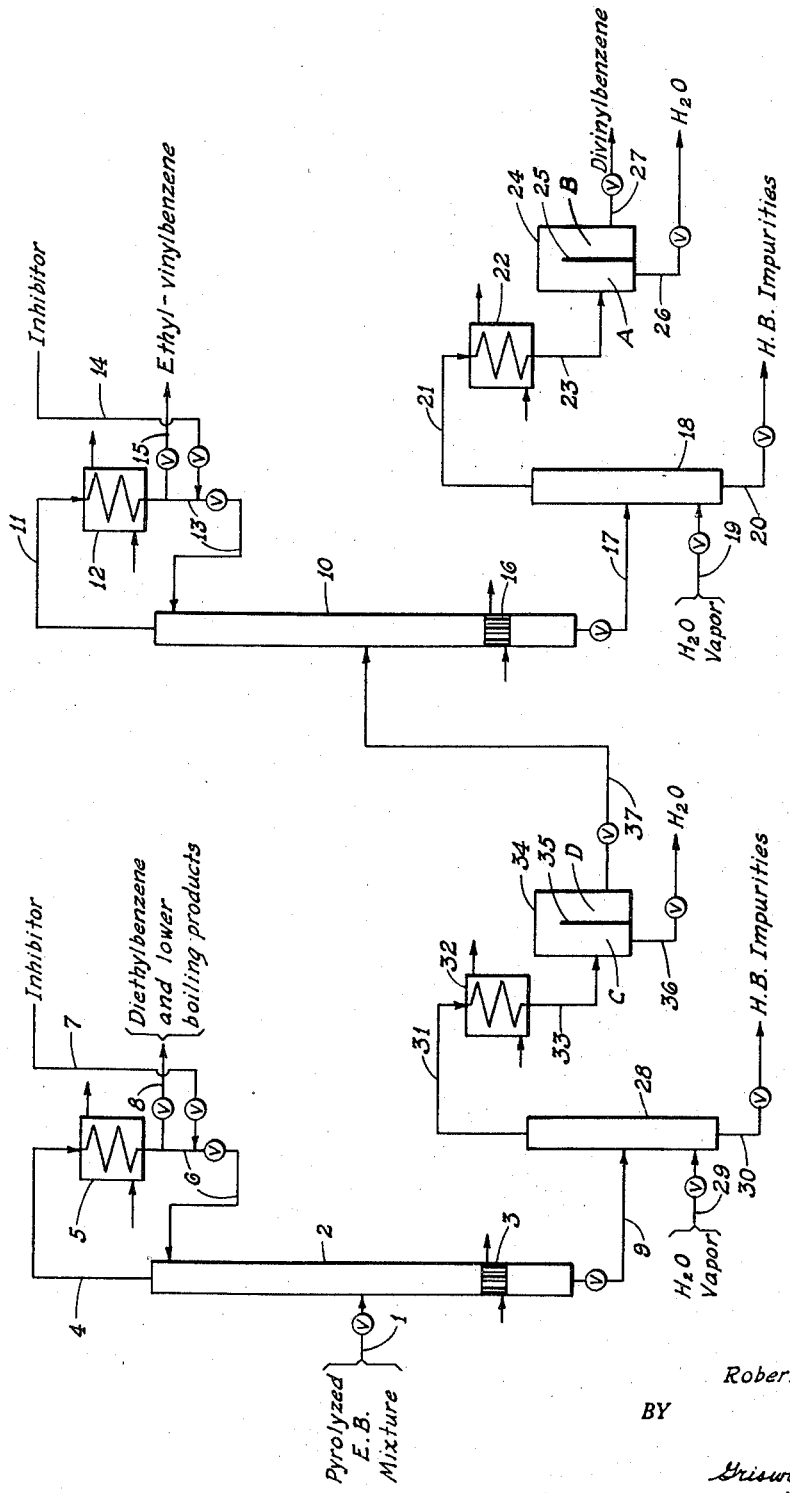

In the accompanying drawing, Fig. 1 is a diagrammatic sketch showing an arrangement of apparatus suitable for use in recovering a mixture of ethyl-vinylbenzene and divinylbenzene from a pyrolyzed diethylbenzene mixture, and Fig. 2 is a diagrammatic sketch showing another arrangement of apparatus suitable for use in recovering divinylbenzene from such pyrolysis mixture.

In Fig. 1, the numeral 1 designates a valved inlet to a distilling column 2 which is provided toward its lower end with a calandria 3. In place of such calandria, a boiler or other suitable heater may be used. A vapor line 4 leads from the top of column 2 and connects with a condenser 5. A valved reflux-return line 6 leads from the condenser and connects with column 2 at an upper section of the latter. A valved line 7, branching from line 6 serves as an inlet for the introduction of a polymerization inhibitor into the reflux liquor. Another valved line 8, which also branches from line 6, serves as an outlet for the distillate. A valved line 9 from the bottom of column 2 connects with another distilling column 10 near the mid-section of the latter. Column 10 is provided at its upper end with a vapor line 11, a condenser 12, and a valved reflux-return line 13. The latter is provided with a valved inlet 14 and a valved outlet 15. Toward its lower end, the column 10 is provided with a calandria, or other heater, 16, and also with a valved line 17 which connects with a third still 18. The still 18 is provided with a steam or water-vapor inlet 19 and, at the bottom, with a valved outlet 20. The still 18 is provided at the top, with a vapor line 21 that connects with a condenser 22. A line 23 leads from the condenser to a continuous separator 24, having an internal vertical baffle 25 which forms, with the outer walls of the separator, two chambers, A and B. A valved outlet 26 leads from chamber A and another valved outlet 27 leads from chamber B. Usual means, not shown, are employed to apply a vacuum to the distilling system.

The apparatus of Fig. 2 of the drawing includes that of Fig. 1, and in the two figures similar parts are similarly numbered. The apparatus of Fig. 2 differs from that of Fig. 1, in that in the line between the distilling columns 2 and 10, there is another still 28 with auxiliary equipment. In other words, in Fig. 2, the line 9 from the bottom of column 2 connects with a still 28 which is provided with a steam or water-vapor inlet 29 and, at the bottom, with a valved outlet 30. The still 29 is provided at the top with a vapor line 31. The latter connects with a condenser 32, which is in turn connected by a line 33 with a continuous separator 34 having an internal vertical baffle 35 that divides it into chambers C and D. Chamber C is provided with a valved outlet 36. A valved line 37 leading from chamber D connects with the distilling column 10 near its mid-section. It will be understood that the arrangements of apparatus shown in both figures of the drawing are illustrative and that they may be changed or modified without departing from the invention.

In employing the apparatus of Fig. 1 for the recovery, from a mixture obtained by the pyrolysis of diethylbenzene, of a mixture of ethyl-vinylbenzene and divinylbenzene, the crude pyrolysis mixture is treated with a minor amount, e. g. from 0.1 to 2 per cent, of a polymerization inhibitor and is introduced in steady flow through inlet 1 into the distilling column 2 where it is heated to a distilling temperature by means of the calandria 3. The distillation is carried out under vacuum, i. e. at below 400 millimeters, and preferably below 50 millimeters, absolute pressure, in such manner as to distill ethyl-toluene and lower-boiling ingredients from the pyrolysis mixture. In addition to the polymerization inhibitor introduced together with the pyrolysis mixture, a further amount of inhibitor is introduced in continuous flow through the inlet 7, in order that the inhibitor may be distributed within the distilling column throughout a major part of its length. A number of polymerization inhibitors which may be used in the process are known. Examples of such inhibitors are sulphur, tertiary-butyl-catechol, nitrophenol, 2.4-dinitrophenol, 2-nitro-4-chloro-phenol, 2.6-dinitro-4-chloro-phenol, 2.4-dibromo-6-nitro-phenol, 2.4-dichloro-6-nitro-phenol, etc. The nitrophenols, such as those just mentioned, are exceptionally effective in stabilizing vinyl aromatic compounds against polymerization and are preferred. One per cent by weight or less of a nitrophenol, based on the vinyl aromatic compounds in the distilling mixture, is usually sufficient to prevent polymerization, but when using other inhibitors larger proportions may be required. The inhibitor may be used in as large a proportion as desired.

The residue from the distillation in still 2, which residue consists largely of diethylbenzene, ethyl-vinylbenzene and divinylbenzene, is passed through line 9 to another distilling column 10 where it is again fractionated, this time to distill the diethylbenzene and leave a concentrated residual mixture of ethyl-vinylbenzene and divinylbenzene. If desired, a portion of the ethyl-vinylbenzene may be distilled together with the diethylbenzene so as to increase the concentration of divinylbenzene in the still residue. During the distillation, a further amount of inhibitor is preferably added through inlet 14 so as to preclude the possibility of polymerization occurring, particularly in the upper section of the distilling column.

It is important that the fractional distillations in columns 2 and 10 be completed, or discontinued, before expiration of the induction period of the vinyl aromatic compounds, particularly the divinylbenzene, since otherwise polymerization with plugging of a column may take place. By using a highly effective inhibitor in the distilling mixtures, the induction period of the divinylbenzene may be prolonged sufficiently to permit completion of said distillations, particularly when the distillations are carried out continuously as just described. However, it is not safe to rely upon the induction period being greater than about 8 hours, even when using an effective polymerization inhibitor. The rate of flow should be such that the contact time, i. e. the average time for the passage of an infinitesimal portion of divinylbenzene through the stills 2 and 10, does not exceed the induction period.

The residual mixture of ethyl-vinylbenzene and divinylbenzene is passed to still 18 where it is distilled under vacuum, i. e. at below 400, and usually between 100 and 150 millimeters absolute pressure, together with approximately an equal weight or more of water vapor. It is desirable that the distilling vapors be condensed at a temperature of 0° C. or above, e. g. at 5°–20° C., so as to avoid freezing of the water; hence, there is a practical, though not sharp, lower limit to the pressures which may be employed in such distillation with water vapor. The fractional distillations without water vapor in columns 2 and 10 may be carried out at absolute pressures as low as desired.

In carrying out the distillation with water vapor in still 18, undistilled material, including the high-boiling colored impurities initially present in the pyrolysis mixture, are withdrawn through outlet 20. The distillate flows to a continuous separator 24 where the aqueous and organic layers thereof are separated. The aqueous layer is withdrawn through outlet 26 and the organic layer through outlet 27. The organic layer usually consists of a colorless mixture of ethyl-vinylbenzene and divinylbenzene. In case it is found to retain lower-boiling impurities, it may be recycled to column 10 for further purification.

In employing the apparatus of Fig. 2 for the recovery of ethyl-vinylbenzene and divinylbenzene, each in concentrated or purified form, the crude pyrolysis mixture is fed into column 2 through inlet 1 and is fractionated under vacuum and in continuous manner to obtain a distillate of diethylbenzene and lower-boiling ingredients, e. g. ethyl-toluene, ethyl-benzene, styrene, etc. The distillation is carried out in the presence of a polymerization inhibitor, e. g. a nitrophenol, which is fed into the column through inlet 7 and is also introduced through inlet 1 together with the crude pyrolysis mixture.

Undistilled material, containing the inhibitor flows from a lower section of column 2 through line 9 to the still 28 where it is distilled under vacuum with water vapor, and the induction periods of the vinyl aromatic compounds are thereby renewed. The distillation with water vapor is usually carried out rapidly without attempt to fractionation. Undistilled material, including high-boiling colored impurities initially present in the pyrolysis mixture, are withdrawn through outlet 30. The distillate flows to a continuous separator 34 where the aqueous layer is separated and withdrawn through outlet 36. The organic layer is passed through line 37 to the distilling column 10, where it is again fractionally distilled under vacuum and in the presence of an inhibitor, added through inlet 14, to recover ethyl-vinylbenzene as distillate and leave the divinylbenzene concentrated in the residue.

The residual concentrated divinylbenzene is passed from the lower section of column 10, through line 17, to still 18 where it is again distilled under vacuum together with water vapor. Any undistilled material, e. g. the inhibitor added in column 10, is withdrawn through outlet 20. The distillate flows to the continuous separator 24 where the layers thereof are separated and the aqueous layer is withdrawn through outlet 26. The purified divinylbenzene product is withdrawn through outlet 27.

Instead of alternately fractionally distilling a pyrolysis mixture in the absence of water vapor and then distilling the residue with water vapor, as just described, the crude pyrolysis mixture, or a fraction thereof, may be fractionally distilled under vacuum together with water vapor and in the presence of an added polymerization inhibitor to separate a readily polymerizable component thereof in concentrated or purified form. However, the alternate distillations without and with water vapor, are most effective in obtaining efficient fractionation.

Although the distillations involved in the process are preferably carried out in continuous manner, as hereinbefore described, they may be carried out batchwise if desired.

The invention has, for sake of clarity, been described with special reference to the problem of recovering divinylbenzene and ethyl-vinylbenzene from a pyrolyzed diethyl-benzene mixture. However, other vinyl aromatic compounds, more readily polymerizable and higher boiling than styrene, may similarly be recovered from pyrolysis mixtures containing the same. For instance, the method may advantageously be applied in recovering para-chlorostyrene from a pyrolyzed para-chloro-ethylbenzene mixture; in recovering vinyl-dichlorobenzene from a pyrolyzed ethyl-dichlorobenzene mixture; and in recovering ethyl-divinylbenzene from a mixture obtained by the pyrolysis of triethylbenzene; etc. In all such instances, it is desirable that the readily polymerizable vinyl aromatic compound be distilled under vacuum together with water vapor and in the presence of a polymerization inhibitor other than the water vapor.

The following examples describe a number of ways in which the principle of the invention has been applied, but are not to be construed as limiting its scope.

EXAMPLE 1

491 grams of a brownish colored mixture of approximately 81.5 per cent by weight ethyl-vinylbenzene and 18.5 per cent divinylbenzene, which mixture had been obtained by pyrolyzing diethylbenzene and vacuum distilling from the pyrolyzed mixture unreacted diethylbenzene and lower-boiling ingredients while gradually adding a polymerization inhibitor during the distillation, was fractionally distilled under vacuum together with water vapor. The mixture of ethyl-vinylbenzene and divinylbenzene subjected to the distillation contained one per cent of 2.4-dichloro-6-nitro-phenol as a polymerization inhibitor. Each fraction of distillate separated into a lower aqueous layer and an upper layer of hydrocarbons. The two layers were separated and the hydrocarbon layer was analyzed. The following table gives the distilling temperatures and the compositions of the successive fractions of distillate. In the table the abreviation "E. V. B." is used for ethyl-vinylbenzene and the abbreviation "D. V. B." is used for divinylbenzene.

Table

| Fraction No. | Distilling Range | | H₂O Layer, Grams | Hydrocarbon Layer, Grams | Composition of Hydrocarbon Layer | |
|---|---|---|---|---|---|---|
| | Temp., °C. | Absolute Press., mm. | | | Per Cent E. V. B. | Per Cent D. V. B. |
| 1 | 72 to 78 | at 286 at 363 | 383.2 | 121.5 | 91 | 9 |
| 2 | 78 to 78 | at 363 at 360 | 400.8 | 116.5 | 77 | 23 |
| 3 | 78 | at 360 | 400.0 | 115.0 | 69 | 31 |
| 4 | 77 to 74 | at 365 at 331 | 386.6 | 93.3 | 56 | 44 |
| 5 | 74 to 74 | at 331 at 315 | 150.3 | 286.0 | 56.5 | 43.5 |
| Residue | | | | 16.0 | | |

EXAMPLE 2

This example illustrates the recovery of a mixture of ethyl-vinylbenzene and divinylbenzene from a more complex mixture obtained by the pyrolysis of diethylbenzene. The crude pyrolysis mixture was unsaturated to an extent which, when expressed in terms of ethyl-vinylbenzene as the unsaturated ingredient, corresponded to the presence of 71.8 per cent by weight of ethyl-vinylbenzene in the mixture. Actually, other unsaturated compounds such as styrene and divinylbenzene also were present. A total of 11,400 pounds of the pyrolysis mixture was treated with about 50 pounds of 2.4-dichloro-6-nitro-phenol and fed at a rate of 30.5 pounds per hour into the mid-section of a distilling column which was operated in continuous manner to obtain a distillate containing ethyl-toluene and lower-boiling ingredients. During operation, a minor amount, i. e. less than 0.5 per cent by weight, of the polymerization inhibitor, 2.4-dichloro-6-nitro-phenol, was dissolved in the portion of the distilled liquor being returned to the column as reflux material. The distillation was carried out at a still-head temperature of approximately 64° C. and an absolute pressure within the still-head of 24 millimeters. Undistilled material, at a temperature of about 120° C., was withdrawn continuously from the bottom of the column. There were collected, as the distillate, 2480 pounds of a clear liquid which analyzed as containing 31.5 per cent of styrene, and, as the still residue, 8606 pounds of liquid having a degree of unsaturation which, when expressed in terms of ethyl-vinylbenzene as the unsaturated ingredient, corresponded to the presence of 80.5 per cent of ethyl-vinylbenzene. Actually, divinylbenzene also was present in the undistilled liquor. A total of 4828 pounds of the still residue was fed at a rate of 36 pounds per hour to a second distillation where it was again fractionally distilled under vacuum while introducing a minor amount, i. e. less than 0.5 per cent, of 2.4-dichloro-6-nitro-phenol into the portion of the distillate being returned as reflux material to the distilling column. The distillation was carried out at a still-head temperature of approximately 89° C. and an absolute pressure within the still-head of 29 millimeters. The liquid in the lower section of the column was at a temperature of about 112° C. Undistilled material was withdrawn continuously from the bottom of the column. There was collected, as the distillate, 1167 pounds of a liquid containing diethylbenzene as the major ingredient, but having a degree of unsaturation corresponding to the presence of 31.2 per cent by weight of ethyl-vinylbenzene. As the residue from the distillation, there was obtained 3660 pounds of a liquid having a degree of unsaturation which, when expressed as being due only to ethyl-vinylbenzene, corresponded to the presence of 98.8 per cent of ethyl-vinylbenzene. Actually, divinylbenzene also was present. A total of 1665 pounds of the last-mentioned still residue was fed at a rate of 20 pounds per hour into a heated retort while introducing steam into the bottom of the retort at a rate of 22 pounds per hour so as to distill a mixture of water vapor, ethyl-vinylbenzene and divinylbenzene from the retort without attempting to fractionate the mixture. The distillation was carried out at a distilling temperature of approximately 75° C. and at 100 millimeters absolute pressure. The aqueous and organic layers of the distillate were separated. As the organic layer of the distillate, there was obtained 1501 pounds of a colorless liquid mixture of ethyl-vinylbenzene and divinylbenzene, which mixture contained approximately 5 per cent of divinylbenzene. As the residue from the distillation, there was obtained 105 pounds of viscous tarry material containing the polymerization inhibitor used in the process.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method for recovering a nuclear substituted styrene which is more readily polymerized than styrene from a pyrolysis mixture containing the same, the steps of subjecting the mixture to a series of distilling operations at subatmospheric pressure, alternately in the absence and in the presence of water vapor, such distillation in the absence of water vapor being a fractional distillation in the presence of a polymerization inhibitor to distill lower boiling material from the nuclear substituted styrene, which fractional distillation is discontinued before appreciable polymerization of the residual nuclear substituted styrene occurs, and each distillation together with water vapor being carried out in the presence of a polymerization inhibitor other than the water vapor on the residue from such fractional distillation without water vapor to distill the nuclear substituted styrene from said residue.

2. The method as described in claim 1 wherein each fractional distillation in the absence of water vapor is carried out in the presence of a polymerization inhibitor which is introduced continuously into an upper section of the distilling column.

3. In a method for recovering para-chlorostyrene from the mixture formed by the pyrolysis of para-ethyl-chlorobenzene, the steps of subjecting the pyrolysis mixture to a series of distillation operations at subatmospheric pressure, alternately in the absence and in the presence of water vapor, each distillation in the absence of water vapor being a fractional distillation which is discontinued before any more than 5 per cent of the para-chlorstyrene is polymerized, each distillation together with water vapor being carried out on the residue from such fractional distillation without water vapor, and all of said distillations being carried out while having present in the distilling mixtures a polymerization inhibitor other than water vapor.

4. In a method of recovering a mixture of ethyl-vinylbenzene and divinylbenzene from the more complex mixture obtained by pyrolyzing diethylbenzene, the steps of subjecting the pyrolysis mixture to a series of distillation operations, each of which is carried out at subatmospheric pressure while having present in the distilling mixture a polymerization inhibitor other than water vapor, one such distillation being carried out in the absence of water vapor to distill and remove ethyl-toluene, the next such distillation being carried out in the absence of water vapor on the residue from the first distillation to distill and remove diethylbenzene, and the two successive distillations just mentioned being discontinued before any of the divinylbenzene is polymerized, a third distillation being carried out with introduction of water vapor into the residue from the second distillation so as to distill together water, ethyl-vinylbenzene and divinylbenzene, and separating the aqueous and organic layers of the last-mentioned distillate to obtain, as the organic layer, a mixture of ethyl-vinylbenzene and divinylbenzene.

5. In a method of recovering ethyl-vinylbenzene and divinylbenzene from a mixture obtained by the pyrolysis of diethylbenzene, the steps of fractionally distilling diethylbenzene and lower-boiling ingredients from the pyrolysis mixture at subatmospheric pressure and in the absence of water vapor while introducing a polymerization inhibitor into an upper section of the distilling column, heating the residue from said distillation at subatmospheric pressure while introducing water vapor to distill the more volatile ingredients and obtain a distillate consisting substantially of ethyl-vinylbenzene, divinylbenzene and water, separating the aqueous and organic layers of the distillate, fractionally distilling ethyl-vinylbenzene from said organic layer at subatmospheric pressure while introducing a polymerization inhibitor into an upper section of the distilling column, and thereafter distilling divinylbenzene from the residue at subatmospheric pressure and together with water vapor.

6. In a method of recovering ethyl-vinylbenzene and divinylbenzene from a mixture obtained by the pyrolysis of diethylbenzene, the steps of dissolving in the pyrolysis mixture a minor amount of a polymerization inhibitor, fractionally distilling diethylbenzene and lower-boiling ingredients from the pyrolysis mixture at subatmospheric pressure and in the absence of water vapor while introducing a polymerization inhibitor into an upper section of the distilling column, heating the residue from said distillation at subatmospheric pressure while introducing water vapor to distill the more volatile ingredients and obtain a distillate consisting substantially of ethyl-vinylbenzene, divinylbenzene and water, separating the aqueous and organic layers of the distillate, dissolving in the organic layer a minor amount of a polymerization inhibitor, fractionally distilling ethyl-vinylbenzene from the resultant mixture at subatmospheric pressure while introducing a polymerization inhibitor into an upper section of the distilling column, and thereafter distilling divinylbenzene from the residue at subatmospheric pressure and together with water vapor.

ROBERT R. DREISBACH.

REFERENCES CITED

The following references are of record in the file of this patent:

UNITED STATES PATENTS

| Number | Name | Date |
|---|---|---|
| 2,186,298 | Kiersted | Jan. 9, 1940 |
| 2,238,016 | Downey | Apr. 8, 1941 |
| 2,240,764 | Dreisbach et al. | May 6, 1941 |
| 2,241,770 | Dreisbach et al. | May 13, 1941 |
| 2,308,229 | Natta | Jan. 12, 1943 |
| 2,312,912 | Kiersted | Mar. 2, 1943 |

FOREIGN PATENTS

| Number | Country | Date |
|---|---|---|
| 541,797 | Great Britain | Dec. 11, 1941 |